United States Patent
Klemm

(10) Patent No.: US 10,339,504 B2
(45) Date of Patent: Jul. 2, 2019

(54) SYSTEMS AND METHODS FOR PRESENTING INFORMATION EXTRACTED FROM ONE OR MORE DATA SOURCES TO EVENT PARTICIPANTS

(71) Applicant: Avaya Inc., Santa Clara, CA (US)

(72) Inventor: Reinhard Klemm, Basking Ridge, NJ (US)

(73) Assignee: Avaya Inc., Santa Clara, CA (US)

( * ) Notice: Subject to any disclaimer, the term of this patent is extended or adjusted under 35 U.S.C. 154(b) by 567 days.

(21) Appl. No.: 14/318,674

(22) Filed: Jun. 29, 2014

(65) Prior Publication Data
US 2015/0379478 A1   Dec. 31, 2015

(51) Int. Cl.
| | |
|---|---|
| G06Q 10/00 | (2012.01) |
| G06Q 10/10 | (2012.01) |
| G06F 16/50 | (2019.01) |
| G06F 16/60 | (2019.01) |
| G06Q 50/00 | (2012.01) |

(52) U.S. Cl.
CPC ......... G06Q 10/1095 (2013.01); G06F 16/50 (2019.01); G06F 16/60 (2019.01); G06Q 50/01 (2013.01)

(58) Field of Classification Search
CPC .... G06Q 10/1095; G06Q 50/01; G06F 16/50; G06F 16/60
See application file for complete search history.

(56) References Cited

U.S. PATENT DOCUMENTS

| | | | |
|---|---|---|---|
| 6,853,716 B1* | 2/2005 | Shaffer | H04M 3/56 370/260 |
| 2004/0135902 A1* | 7/2004 | Steensma | G06F 17/30876 348/231.99 |
| 2007/0096909 A1* | 5/2007 | Lally | G06K 7/0008 340/572.1 |
| 2008/0126990 A1* | 5/2008 | Kumar | G06Q 10/10 715/835 |

(Continued)

OTHER PUBLICATIONS

"Automatic image semantic interpretation using social action and tagging data" N Sawant, J Li, JZ Wang—Multimedia Tools and Applications, 2011—dl.acm.org.*

(Continued)

*Primary Examiner* — Jonathan G Sterrett

(57) ABSTRACT

Systems and methods for dynamically responding to requests for information, derived from one or more data sources, relating to at least one event participant. A notification of a scheduled event is received at a server. The notification identifies a plurality of individuals invited to attend or participate in an event. Data attributes relating to the event participants are retrieved from one or more data sources and stored. The data attributes can include personal attributes, professional attributes, and social interaction attributes. Before, during or after an event, requests are received and processed to provide event participants and other interested parties access to contextual information relating event participants to one another, the identities of event participants possessing one or more attributes, and lists of attributes for one or more known event participants. The requests can include images and sound recordings captured during the event.

19 Claims, 10 Drawing Sheets

(56) References Cited

U.S. PATENT DOCUMENTS

| | | | | |
|---|---|---|---|---|
| 2010/0011373 A1* | 1/2010 | Youel | ................. | G06Q 10/107 |
| | | | | 719/313 |
| 2012/0116559 A1* | 5/2012 | Davis | ..................... | G06F 3/002 |
| | | | | 700/94 |
| 2014/0108526 A1* | 4/2014 | Garcia-Barrio | ........ | G06Q 50/01 |
| | | | | 709/204 |

OTHER PUBLICATIONS

Information architecture: Facetag: Integrating bottom-up and top-down classification in a social tagging system E Quintarelli, A Resmini, L Rosati—Bulletin of the American . . . , 2007—Wiley Online Library.*

Tagsense: a smartphone-based approach to automatic image tagging C Qin, X Bao, R Roy Choudhury . . . —Proceedings of the 9th . . . , 2011—dl.acm.org.*

Inducing ontology from flickr tags P Schmitz—Collaborative Web Tagging Workshop at WWW2006 . . . , 2006—ambuehler.ethz.ch.*

* cited by examiner

200

| SOCIAL NETWORK DATA ATTRIBUTES 202 | | |
|---|---|---|
| PERSONAL 204 | PROFESSIONAL 206 | POSTING ACTIVITY (INTERACTIONS) |
| FRIENDS | COLLEAGUES | SENTIMENTS ABOUT A BUSINESS |
| HOBBIES | EDUCATION | ATTITUDES ABOUT AN INSTITUTION |
| HOMETOWN | CURRENT EMPLOYER | ATTENTON TO CURRENT EVENTS |
| CURRENT RESIDENCE | PRIOR EMPLOYER(S) | INVOLVEMENT IN COMMUNITY AFFAIRS |
| PAST RESIDENCE(S) | CURRENT SUPERVISOR | WORK/LIFE BALANCE |
| PRIMARY EDUCATION | PRIOR SUPERVISOR | SOCIAL CALENDAR |
| SECONDARY EDUCATION | FORMER COLLEAGUES | UPCOMING EVENTS |
| SPOUSE'S NAME | JOB TITLE | SPORTS EVENT ATTENDANCE |
| BIRTHDATE | FORMER JOB TITLE | PUBLIC AWARDS RECOGNITION |
| WEDDING ANNIVERSARY | SKILLS & EXPERTISE | MAJOR PURCHASES |
| MARITAL STATUS | COLLEGE DEGREE(S) AND ATTENDANCE | |
| FACIAL IMAGE | WORK ANNIVERARY | |
| VOICE SAMPLE(S) / CHARACTERIZATION | | |

FIG 2

SYSTEMS AND METHODS FOR PRESENTING INFORMATION EXTRACTED FROM ONE OR MORE DATA SOURCES TO EVENT PARTICIPANTS

BACKGROUND OF THE INVENTION

Field of the Invention

Embodiments of the present invention generally relate to facilitating meetings, conferences and other events to which a plurality of participants are invited and, more particularly, to methods and systems for enhancing the effectiveness of such events.

Description of the Related Art

When a multiple participant conference or meeting is conducted, be it a video conference, webinar, or face-to-face event, the event attendees (e.g. invited participants and presenters) may have little or no information about many of the other attendees, including their relationships with each other. Such deficiency in knowledge is especially likely when the number of event invitees is very large (say, on the order of scores, hundreds or even more) and the invitees themselves come from a variety of divisions of a large business, or even from outside the business (e.g. customers, vendors, partners, members of the public, and so on).

A lack of access to such contextual information as the associations relating event attendees with one another and the attributes differentiating them from one another, taking into account their respective backgrounds, education, skills, and expertise can substantially diminish a participant's opportunities for professional growth, personal development, and expansion of his or her personal and professional networks. It can also decrease the efficiency or effectiveness of a presentation to or conversation with meeting participants.

A need therefore exists for systems and methods for aggregating and presenting information, extracted from one or more data sources, to event invitees and attendees.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for dynamically responding to requests and queries for information relating to one or more event invitees or attendees, by reference to data attributes extracted from one or more data sources, is described. According to one or more embodiments, the method receives a notification of a scheduled event. The notification identifies a plurality of individuals invited to attend or participate in the event. In some embodiments, the method retrieves and stores data attributes relating to at least some of the event participants from one or more data sources. The data attributes can include personal attributes, professional attributes, and social connection and interaction attributes. The retrieved data attributes are supplemented, in some embodiments, by additional information supplied by the invitees themselves. Before, during or after an event, the method receives and responds to information requests and queries from event invitees, attendees and other interested parties.

In some embodiments, the method receives and responds to requests for contextual information relating at least one event attendee or invitee to at least one other event attendee or invitee. In addition or alternatively, the method receives and responds to requests for contextual information differentiating at least one event attendee or invitee from at least one other event attendee or invitee. In addition or alternatively, the method receives and responds to queries seeking the identity of event attendees or invitees possessing a specific attribute or set of attributes or seeking a list of attributes associated with one or more identified event participants or attendees. The requests are submitted by a communication terminal configured to present a standardized user interface for presenting requests, formulating queries, and viewing the responses returned according to one or more embodiments.

In another embodiment, an apparatus for dynamically responding to requests and queries for information relating to one or more event invitees or attendees, by reference to data attributes extracted from one or more data sources, is described. The apparatus includes a computer having one or more processors and further comprises an augmented event request processing module operative to retrieve, store and analyze data attributes relating to at least some event invitees or attendees. The apparatus is further operative to receive at least one of requests for contextual information relating a first event participant to at least a second event participant, queries to return the identity of one or more attendees or invitees characterized by a particular attribute, and queries to return the attributes of one or more identified attendees or invitees. The apparatus is further operative to generate and return contextual information to a requester responsive to received requests or to retrieve and return identities or attributes responsive to received queries.

In yet another embodiment, a computer readable medium for dynamically responding to requests and queries for information relating to one or more event invitees or attendees, by reference to data attributes extracted from one or more data sources, is described. The computer readable medium stores computer instructions that, when executed by at least one processor cause the at least one processor to perform a method for dynamically responding to requests and queries for information relating to one or more event invitees or attendees, by reference to data attributes extracted from one or more data sources.

BRIEF DESCRIPTION OF THE DRAWINGS

FIG. 2 is a tabular representation of data attributes provided by invitees or retrieved automatically from one or more data sources such, for example, as one or more social network sites, and utilized by an interactive event attendee information response unit according to one or more embodiments;

Figure 1A:
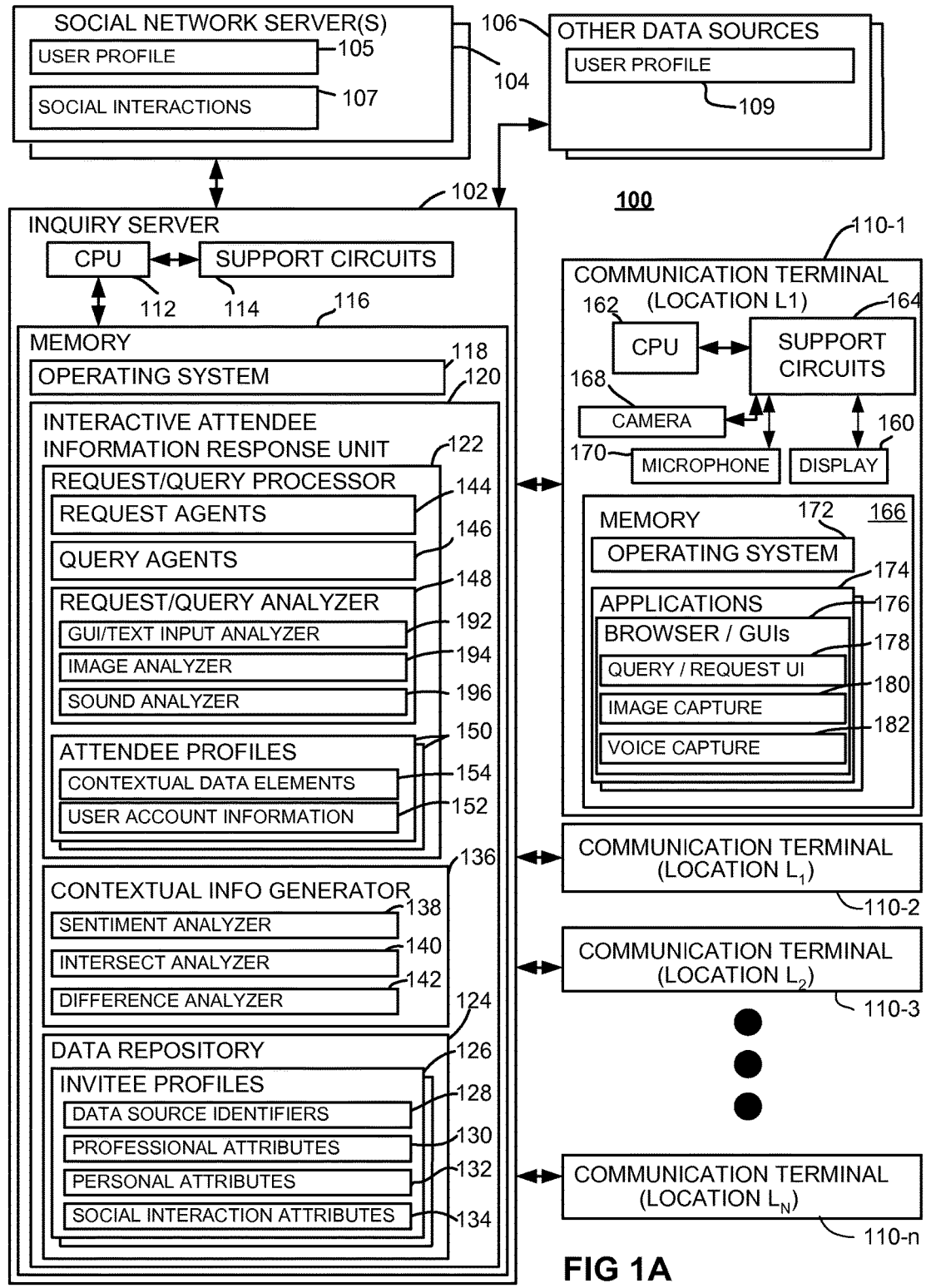
FIG. 1A is a block diagram of a system configured to dynamically respond to requests and queries for information relating to one or more event invitees or attendees, in accordance with one or more embodiments.

While the method and apparatus is described herein by way of example for several embodiments and illustrative drawings, those skilled in the art will recognize that the method and apparatus for dynamically responding to requests and queries for information relating to one or more event invitees or attendees is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for dynamically responding to requests and queries for information relating to one or more event invitees or attendees defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Systems and methods for dynamically responding to requests for information, derived from one or more data sources, relating to at least one event participant are described. A notification of a scheduled event is received at a server. The notification identifies a plurality of individuals invited to attend an event (collectively, "event participants"). Data attributes relating to the event participants are retrieved from one or more data sources and stored. Invitees can provide additional data attributes about themselves. The data attributes can include personal attributes, professional attributes, and social connection and interaction attributes. Before, during or after an event, requests are received and processed to provide event participants and other interested parties access to contextual information relating event participants to one another, the identities of event participants possessing one or more attributes, and lists of attributes for one or more known event participants. The requests can include images and sound recordings captured during the event.

Various embodiments of a method and apparatus for dynamically responding to requests and queries for information relating to one or more event invitees or attendees are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1A is a block diagram of a system 100 configured to dynamically respond to requests and queries for information relating to one or more event invitees or attendees, in accordance with one or more embodiments. According to some embodiments, system 100 includes an invitee/attendee inquiry server 102, one or more social networking site servers, collectively referred to as social network server 104, other data sources (servers and databases) 106, and applications 108 configured for execution on a plurality of communication terminals as communication terminals 110-1 through 110-n.

The various components of system 100, including servers 102, 104, data sources 106, and terminals 110 are connected by one or more network links. Some of the links are established by a network which includes a communication system that connects computers (or devices) by wire, cable, fiber optic and/or wireless link facilitated by various types of well-known network elements, such as hubs, switches, routers, and the like. The network interconnecting some components may also be part of the Intranet using various communications infrastructure, such as Ethernet, Wi-Fi, a personal area network (PAN), a wireless PAN, Bluetooth, Near field communication, and the like.

Social network server 104 is a computing device, for example a desktop computer, laptop, tablet computer, and the like, or social network server 104 may be a cloud based server e.g., a blade server, virtual machine, and the like. For each registered member or subscriber, social network sever 104 maintains a user profile 105 and, in some cases, social interactions 107. User profile 104 typically contains data attributes provided by the member, but can also be the result of automated retrieval from one or more public data sources. Social interactions 107 include date/time indexed messages representing the expression of a member's thoughts, ideas, and sentiments as part of a free exchange of information between one member and another.

The inquiry server 102 includes a Central Processing Unit (CPU) 112, support circuits 114, and a memory 116. The CPU 112 may include one or more commercially available microprocessors or microcontrollers that facilitate data processing and storage. The various support circuits 114 facilitate the operation of the CPU 112 and include one or more clock circuits, power supplies, cache, input/output circuits, and the like. The memory 116 includes at least one of Read Only Memory (ROM), Random Access Memory (RAM), disk drive storage, optical storage, removable storage and/or the like.

The memory 116 includes an operating system 118, and an interactive attendee information response (AIR) unit 120 including a request/query processor 122 and a data repository 124 containing data attributes available from social networking server 104, other data sources 106, and input provided by the event invitees and attendees themselves. The data attributes are organized within invitee profiles 126 and can include one or more unique data source identifiers 128, each associating a user with a corresponding social network site or other accessible data source, professional attributes 130, personal attributes 132, and social interactions 134. AIR Unit 120 further includes a contextual information generator 136, which includes a sentiment analyzer 138, an intersect analyzer 140, and a difference analyzer 142.

Each of user communication terminals or devices 110-1 to 110-n is a computing device, for example a desktop computer, laptop, tablet computer, Smartphone, and the like that includes or is connected to a display and user input devices such as a mouse, keyboard, touch screen, camera, microphone, etc. The user device 110-1, for example, includes a touch screen display 160, Central Processing Unit (CPU) 162, support circuits 164, a memory 166, a camera 168, and a microphone 170.

CPU 162 includes one or more commercially available microprocessors or microcontrollers that facilitate data processing and storage. The various support circuits 164 facilitate the operation of CPU 162 and include one or more clock circuits, power supplies, cache, input/output circuits, and the like. The memory 166 includes at least one of Read Only Memory (ROM), Random Access Memory (RAM), disk drive storage, optical storage, removable storage and/or the like. The memory 166 includes an operating system 172 that provides a computing foundation for software applications 174 of the user device 110-1. The memory 166 includes applications such as a locally installed invitee/attendee application or client, or a browser 176 for invoking and displaying a graphical user interface (GUI) to the user via display 160. Functions which may be locally invoked by local execution of browser GUI 176 include request and query interfaces 178, as well as optional image and voice capture interfaces 180 and 182. According to one or more embodiments, image capture interface 180, enables a user to capture one or more images of event attendees and submit the image(s) as part of a request to inquiry server 102. Likewise, voice capture interface 182, enables a user to capture a sample of an event attendee's voice and submit the sample as part of a request to inquiry server 102. In some cases, the target attendee may have provided a reference sample as part of a registration process. In other cases, the target attendee may have delivered a publically accessible audio-visual presentation, which presentation furnishes the necessary reference sample to server 102.

Figure 1B:
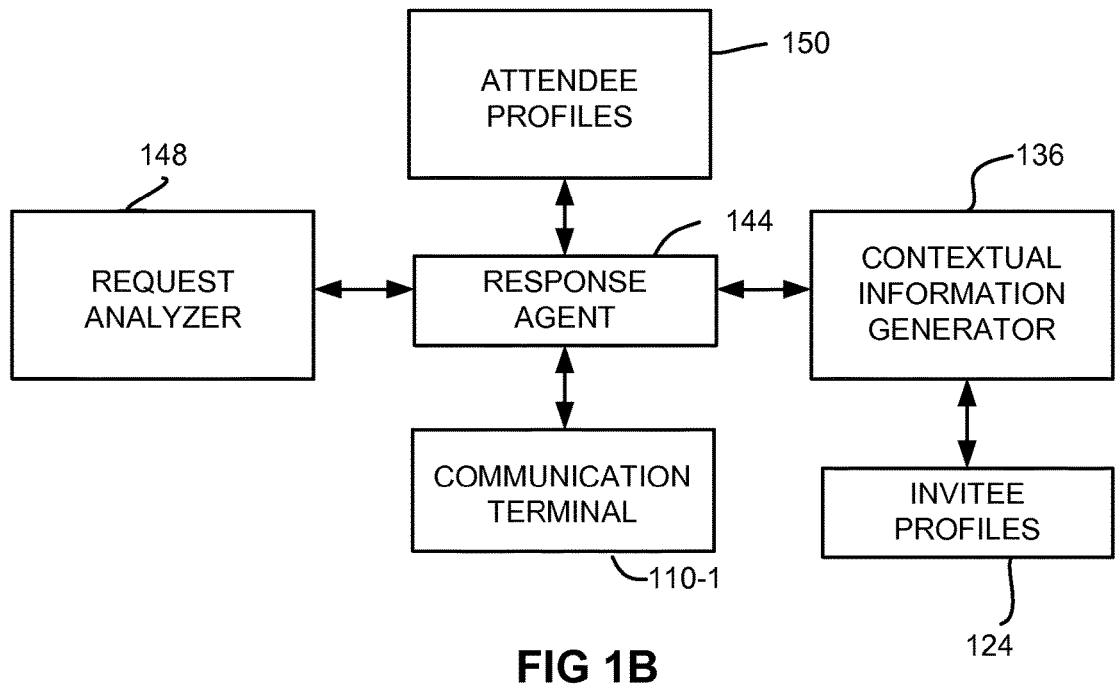
FIG. 1B is a block diagram depicting the interaction between functional components of an interactive attendee information response unit forming part of the system of FIG. 1A according to an embodiment.

As seen in FIG. 1A, the request/query processor 122 of the AIR Unit 120 of server 102 also includes a request agent 144, a query agent 146, and a request/query analyzer 148. FIG. 1B is a block diagram depicting the interaction between functional components of AIR Unit 120 according to an embodiment. Request agent 144 receives requests from any of a plurality of communication terminals 110-1 to 110-n of FIG. 1A, such as communication terminal 110-1. In some embodiments, the requests are entered using a graphical user interface 178 associated with browser application 176.

According to some embodiments, the request agent 144 is configured by programming logic to forward those portions of a request input as text or by manipulation of GUI objects to text/graphical input analyzer 192. An exemplary request entered by a user of terminal 110-1 may comprise a series of mouse clicks highlighting certain names on an invitee or attendee list. As a further example, a mouse or touch screen associated with device 110-1 may be used to draw links between avatars associated with particular seating positions, or to highlight these avatars. According to some embodiments, such use of GUI 178 represents a request by the user for contextual information relating the tagged or identified individuals to one another, or to the requester, or to highlight the absolute or degrees of difference between each of the individuals from one another. Commonalities and differences, in some embodiments, are expressed in absolute terms, as degrees of similarity or dissimilarity according to a distance function, or some combination of these. These commonalities and differences, once computed, are stored as contextual data elements 154 as part of one or more attendee profiles 150.

Likewise, and according to some embodiments, the request agent 144 is configured by programming logic to forward those portions of a request input as one or more captured images to facial image analyzer 194. By way of example, a user of system 100 may operate the image capture device of a Smartphone or tablet, or a digital camera to capture a single image containing the facial image(s) of one or more event attendees, or to capture a series of such images. Through conventional facial recognition and image analysis processes, image analyzer 194 uses reference images existing as personal attributes 132 in data repository 124. In some embodiments, reference images may comprise part of the user account information 152 residing in invitee profiles 150. The reference images and submitted images are analyzed to identify one or more individuals about whom a requester is seeking contextual information.

Likewise, and according to some embodiments, the request agent 144 is configured by programming logic to forward those portions of a request input as one or more captured sound recordings to voice analyzer 196. By way of example, a user of system 100 may operate the microphone of a Smartphone or tablet, or a digital voice recorder to capture a single recording containing the utterances of one event attendees, two or more attendees having a conversation, or a series of such recordings. Through conventional voice print analysis processes, the details of which are omitted herein for clarity and brevity of disclosure, voice analyzer 196 uses reference voice samples existing as personal attributes 132 in data repository 124 or residing as part of the user account information 152 of invitee profiles 150. The reference voice print data or samples, and submitted samples, are analyzed to identify one or more individuals about whom a requester is seeking contextual information.

FIG. 10 is a block diagram depicting the interaction between some of the functional components of AIR Unit 120 according to an embodiment. Query agent 146 receives requests from any of a plurality of communication terminals 110-1 to 110-n of FIG. 1A, such as communication terminal 110-2. In some embodiments, the queries are entered using a graphical user interface associated with a browser application as exemplified by terminal 110-1 in FIG. 1A. According to some embodiments, the query agent 146 is configured by programming logic to forward those portions of a request input as text or by manipulation of GUI objects to text/graphical input analyzer 192. An exemplary natural language text query entered by a user of terminal 110-2 may be "Which invitees attended University X" or "Which attendees work for Company Y". In some embodiments, a locator services adjunct module (not shown), whose services are available to query agent 146, tracks the locations of attendees within a building. In such embodiments, a further query might be "Is John Smith here and, if so, where is he?" or "Is John Smith's supervisor here and if so, who and where is (s)he?" In addition to providing a negative or affirmative response, a response to (or anticipation of) the latter question might be for agent 146 to initiate rendering of a pointer on the display of the communication terminal of the user submitting the query. In some embodiments, the pointer forms part of an augmented reality viewer which guides the user to the subject(s) of the query.

Another important type of query, addressed by some embodiments, identifies connections between participants. A query takes two or more persons as input and outputs known relationships between these people (professional or otherwise) as retrieved from enterprise-internal and external social networks. An other supported query takes one person as its input and a connection type X as input and output the person(s) who have connection X with the input person. X could be "supervisor", "project team member", "direct report", and so on.

According to some embodiments, the query agent 146 is configured by programming logic to forward those portions of a query input as one or more captured images to facial image analyzer 194. By way of example, a user of system 100 may operate the image capture device of a Smartphone or tablet, or a digital camera to capture a single image containing the facial image(s) of one or more event attendees, or to capture a series of such images. Through conventional facial recognition and image analysis processes, image analyzer 194 uses reference images existing as personal attributes 132 in data repository 124. In some embodiments, reference images may comprise part of the user account information 152 residing in invitee profiles 150. The reference images and submitted images are analyzed to identify one or more individuals about whom a party is seeking an identity or enumeration of data attributes from data repository 124. The identity or data attributes so determined are returned by query agent 146.

Likewise, and according to some embodiments, the query agent 146 is configured by programming logic to forward those portions of a request input as one or more captured sound recordings to voice analyzer 196. By way of example, a user of system 100 may operate the microphone of a Smartphone or tablet, or a digital voice recorder to capture a single recording containing the utterances of one event attendees, two or more attendees having a conversation, or a series of such recordings. Through conventional voice print analysis processes, the details of which are omitted herein for clarity and brevity of disclosure, voice analyzer 196 uses reference voice samples existing as personal attributes 132 in data repository 124 or residing as part of the user account information 152 of invitee profiles 150. The reference voice print data or samples, and submitted samples, are analyzed to identify one or more individuals about whom a party is seeking an identity or enumeration of data attributes from data repository 124. The identity or data attributes so determined are returned by query agent 146.

Returning to FIG. 1A, the social networking site server 104 is host to a social networking site, for example, FACEBOOK, LINKEDIN, TWITTER, BEHANCE, and the like. This can also be an enterprise-internal social network site that connects employees and business partners with each other and shows both hierarchical relationships between employees and voluntary, interest-based connections (e.g., the enterprise-internal equivalent of "friending" someone). The social networking site server 104 manages subscriber profiles 105 which can contain user credentials (e.g., usernames and passwords or access tokens) used to control access to personal and professional data attributes and other resources furnished by, collected from, or associated with users of a social networking site. It also manages connections between subscribers. Each social network server further manages social interactions 107, which include the posting activity, "follows", and "likes"/"dislikes" of the social network subscribers. Other data sources 106 may operate similar to social networking server 104, containing user profiles 109 which may or may not require furnishing user access credentials for access.

In FIG. 2, there is shown a tabular representation 200 of exemplary data objects derived from social networking interactions 202, and also including personal data attributes 204 and professional data attributes 206 available from social networking sites 104, other data sources 106, and the event invitees and attendees themselves.

As used herein, social interactions 107 include any form of social engagement. In one embodiment, social interactions 107 include content, such as messages posted to a social network, which a user or potential user of augmented communication services has tagged with a follow or like. In another embodiment, social interactions 107 include stored comments contributed by a subscriber to a blog or other social network site. In yet another embodiment, social interactions 107 include likes, dislikes and follow activity, as well as stored user comments.

Sentiment analyzer 138 analyzes the content of messages for certain key words and phrases, to classify messages based on expressed sentiments such as feelings about a business, industry, current events, and the like. Other attributes derived from social interactions 107 include community involvement, major purchases, social activities in which a party participated or plans to participate, and the like. Examples of attributes 202 derived from social network interactions are exemplified by FIG. 2. Attributes derived from social network interactions 107, user profile 105, other data sources 106 such as an enterprise server and publicly available sources such as the internet, and any profiles furnished directly to server 102 as part of a registration process or ongoing profile administration, are processed independently and in parallel by intersect analyzer 140 and difference analyzer 142.

The intersect analyzer 140 determines commonalities between data attributes associated with individuals identifies in a request handled by request agent 144. These include, as exemplified by FIG. 2, common relationships (e.g., shared friends, shared acquaintances, colleagues, or supervisor-subordinate), background, interests, skills, expertise, past employers, education history, hometown, and other items of interest which might be used as "touch points" during an initial or subsequent communication between the requester and individuals identifies as part of a request. The difference analyzer 142, on the other hand, identifies data objects (which consist of one or more groupings of data attributes) which contain no overlap).

In some embodiments, intersections and differences are additionally computed by intersect analyzer 140 and difference analyzer 142, respectively, on a relative scale rather than as absolute values (e.g., as "degrees of intersection" and "degrees of difference" with respect to an attribute or set of attributes). In an embodiment, relative scale computations are performed using a distance function for each attribute. As contextual data elements, a graphical representation—depicting a relative distance between the same attribute for a requester and one or more other event attendees identified in a request, or between two or more event attendees indentifies in a request—would highlight the search results in a way that can be readily appreciated at a glance. Consider the following examples:

- for an "age" attribute, the distance is the difference of two ages
- for a "work location" or "home location" the distance can be the actual linear distance, in miles or km, between two locations
- for an "interests" attribute, characterized by such values as "classic music concerts", "candlelight dinners", "dirt bike racing", "skydiving" and "hang gliding", the distance between "skydiving" and "hang gliding" would be considerably smaller Furthermore, the intersection and difference analysis extends, in some embodiments, to the personal connections of the request and other event participants, or between respective pairs of attendees/invitees identified in a request. As part of the intersection and differences analysis, data attributes and personal relationships can be pre-identified as "common" or "opposites", wherein detection of commons and opposites triggers display to the endpoint of a call recipient, a call originator, or both.

As examples of generating contextual data elements from available data attributes by operation of contextual information generator 126, a data object "EDUCATION" might include, as data attributes, the names of the primary school, secondary school, and post-secondary schools which each participant or potential participant attended. Accordingly, embodiments of intersect generator 140 are configured to generate the expression, "you (or they) both attended X High School" is an example of an "education" contextual data element given the existence of attributes to this effect in data repository 124. Likewise, the data object "HOBBIES" might include, as data attributes, the names of each leisure activity engaged in by the attendees as for example, fishing, hunting, playing tennis, hiking, bird-watching, and jogging. Accordingly, embodiments of intersect generator 140 are configured to generate the expression, "you (or they, as the case may be) enjoy playing poker" as a contextual data element given the existence of attributes to this effect in data repository 124.

As still further examples, the data object "COMMUNITY ACTIVITIES" might include, as data attributes, the charities in which the participants are active, their place of worship (or definitive lack thereof), role(s) as a volunteer such as firefighting" and the like. Here, embodiments of difference generator 142 are configured to generate the expression, "you (or they, as the case may be) are both active volunteer firefighters" as a contextual data element given the existence of attributes to this effect in data repository 124.

As yet another example, the data object "EMPLOYMENT HISTORY" might include, as data attributes, the names of each former employer, former supervisor, former colleague, and job title. Some or all of the above data attributes may have been derived from one or more social network data repositories 104, other data sources 106 or contributed as user profiles by the participants themselves. It suffices to say that given any pair of potential parties to a communication session for whom access to a collection of data objects and attributes is provided, the intersect analyzer 140 and the difference analyzer 142 are configured, respectively, to perform the complementary tasks of identify those data attributes any pair of attendees (inclusive of the requester) have in common and identifying those data objects which have no overlap whatsoever. In an embodiment, the difference analyzer 142 is further responsive to input from the sentiment analyzer 138 to identify those subjects about which the attendees have opposing views.

Figure 1C:
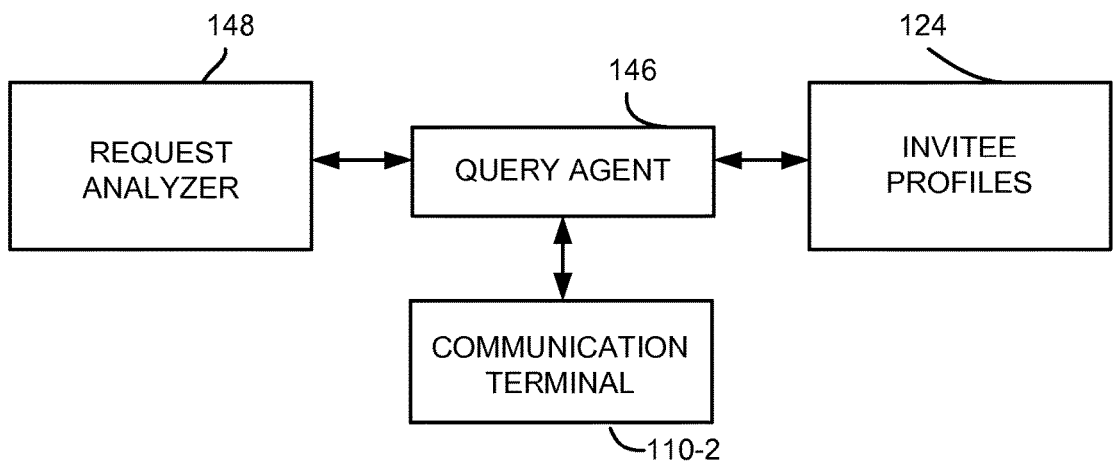
FIG. 1C is a block diagram depicting the interaction between functional components of an interactive attendee information response unit forming part of the system of FIG. 1A, according to a further embodiment.
Figure 3:
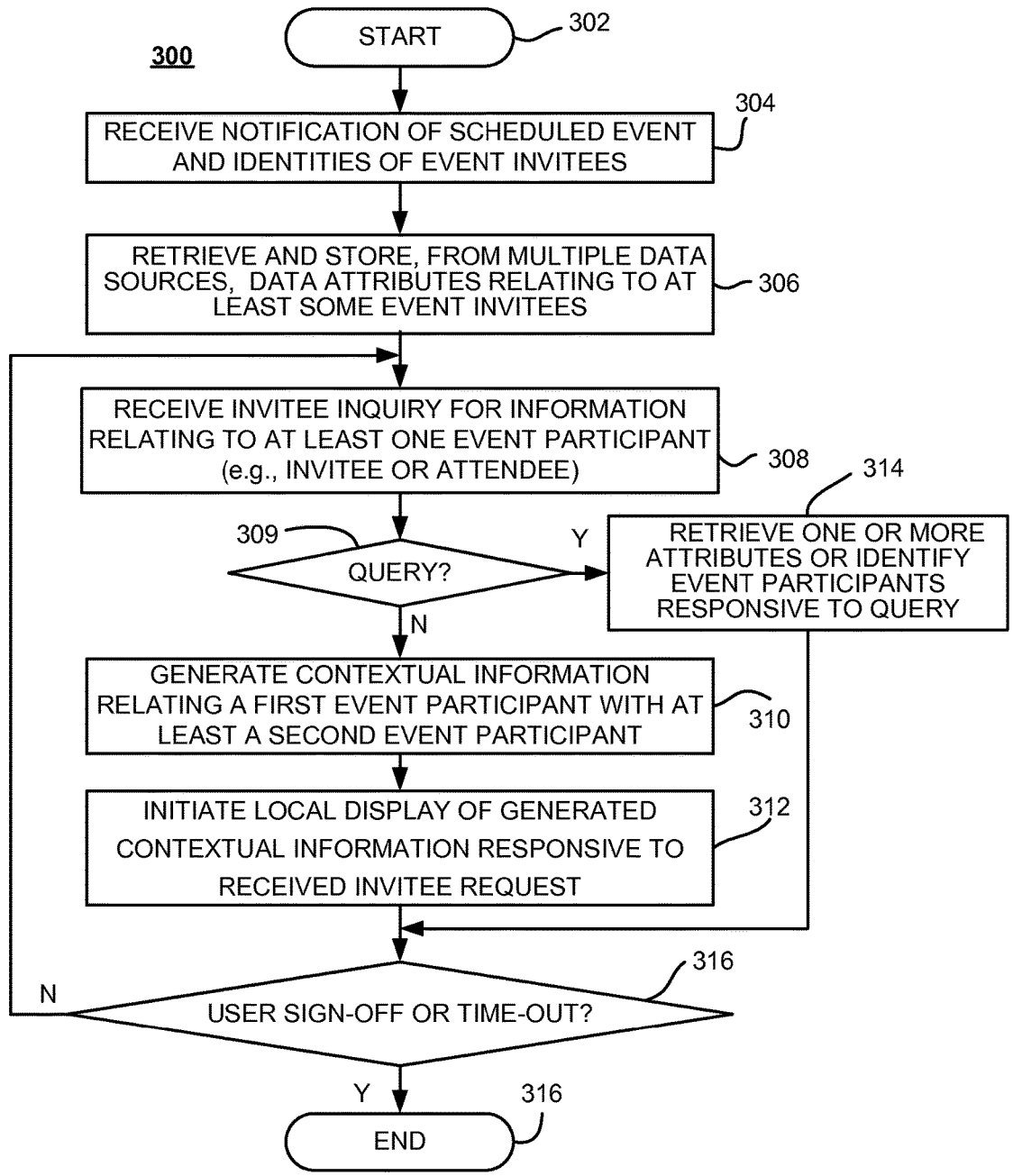
FIG. 3 is a flow diagram depicting a method for dynamically responding to requests and queries for information relating to one or more event invitees or attendees in accordance with one or more embodiments, as performed by the interactive event attendee information response unit of FIG. 1, according to one or more embodiments.

FIG. 3 is a flow diagram depicting a method for dynamically responding to requests and queries for information relating to one or more event invitees or attendees in accordance with one or more embodiments, as performed by the illustrative interactive event attendee information response unit 120 of FIG. 1, according to one or more embodiments. The method 300 utilizes contextual information (i.e., contextual data elements) to enhance the experiences of event attendees. In some embodiments, the method provides 300 provides those attendees having access to a mobile terminal (including, for example, a Smartphone, Personal Digital Assistant (PDA), tablet computer, or wearable computer (e.g., Google Glasses) with an organized interface for requesting, acquiring and displaying useful and relevant contextual information relating the attendees (inclusive of the requester, if desired) to one another. The method 300 starts at step 302 and proceeds to step 304.

At step 304, the method 300 receives a notification of scheduled event and a roster of event invitees. In some embodiments, the event notification includes an event identifier uniquely identifying the event. The event itself may be a webinar, an interactive web conference, an in-person conference attended by many participants, a dial-in audio conference or some combination of these. The method associates an event identifier with a time and place of the event. The time and place of the event may be supplied as part of the notification, or independently through, for example, an administrative workstation or interface (not shown) associated with server 102.

In some embodiments, an initial event notification includes a roster of persons invited to attend the event. Alternatively, the first and last names of the invitees, as well as their contact details (e.g., work numbers, personal or work, e-mail address, etc) may be entered by an administrator using an administrative workstation or interface as discussed above. As yet another example, the names and contact information of invitees can be added automatically (by retrieval from a database) one a "one-at-a-time" bases as the invitees complete a registration or invitation acceptance process associated with the event. As part of such a registration process, or in a prior "eligibility for registration" phase, a prospective participant may provide a voice sample, a photo of themselves, various personal and professional information (each, a "data attribute"), as well as user identifiers associated with one or more social networks 104 and/or other data sources 106 (FIG. 1).

The method 300 proceeds to step 306, where the method 300 retrieves, from one or more data sources including social networking sites, enterprise personal databases, and existing user account information, data attributes. According to embodiments, method 300 stores the retrieved attributes in a data repository.

The method 300 proceeds to step 308, where the method 300 receives an inquiry from an invitee, attendee, or other interested part, for information relating to one or more event invitees or attendees (each, an "event participant"). According to an embodiment, the method 300 receives and responds to several types of inquiries.

A first type of inquiry, referred to herein as a "request", seeks contextual information which either relates two or more invitees or attendees with one another or identifies their differences. Examples of the former include expressions which reference personal or professional attributes common to two or more event participants identified in a request. One such expression is "Both John Smith and Michael Johnson work for Company X". Examples of the latter include expressions which reference data objects (sets of data attributes), or an attribute, which differentiates the person making the request from another of the event participants. As an example, if the person making the request speaks only English and one or more other persons identified in the request speak only German, then a possible expression would be "Helmut Schmidt does not speak English". In this regard, if only one participant is specified in a request, method 300 presumes by implication, in some embodiments, that the requester is another participant.

A second type of inquiry, referred to herein as a "query", seeks specific information such as details (one or more personal or professional attributes) about a specific invitee (or attendee) identified by name, by voice sample, or by an image. Conversely, an alternate query may specify one or more details and seek the identity of one or more invitee(s) or attendee(s) possessing that attribute. Either of these two classes of query may be followed up by a secondary query as, for example, the current location of the person(s) specified in a prior query or in a response to such prior query.

According to some embodiments, the method 300 proceeds to determination step 309, where the method determines whether the inquiry is a request or a query. If the inquiry is not a query, the method 300 proceeds to step 310, where the method generates one or more contextual data elements (i.e., expressions relating each event participant with at least one other event participant specified in a request) are generated as contextual information responsive to the received request. Each data element corresponding to a group of two or more attendees is stored in a repository or in an attendee profile database indexed to allow rapid retrieval of those data elements relevant to each attendee applicable to a user-identified group If any such data elements already exist prior to a current event, as by prior performance of method 300 in connection with an earlier event, these data elements are retrieved as part of step 310. In some embodiments, step 310 is re-performed for all attributes and updated for each event. The re-performance can occur automatically, and alert a participant as to any changes, or on-demand only in response to a new request involving a group, or subset of a group, of participants. The method proceeds to step 312, where method 300 initiates the display of the contextual information generated and/or retrieved at step 310, to a requester's communication terminal.

If on the other hand, the method 300 determines at step 309 that the inquiry is a query, then the method proceeds to step 314. At step 314, the method searches a data repository containing personal and professional attributes, and returns a list of identified attributes or participants responsive to the query. From either of steps 312 and 314, the process proceeds to determination step 316. If the party submitting the inquiry signs off, manifesting intent to make no further inquiries, the method terminates at step 316. If further inquiries are pending, or a time out period permitting submission of further queries has not yet been reached, the method returns to step 308.

Figure 4:
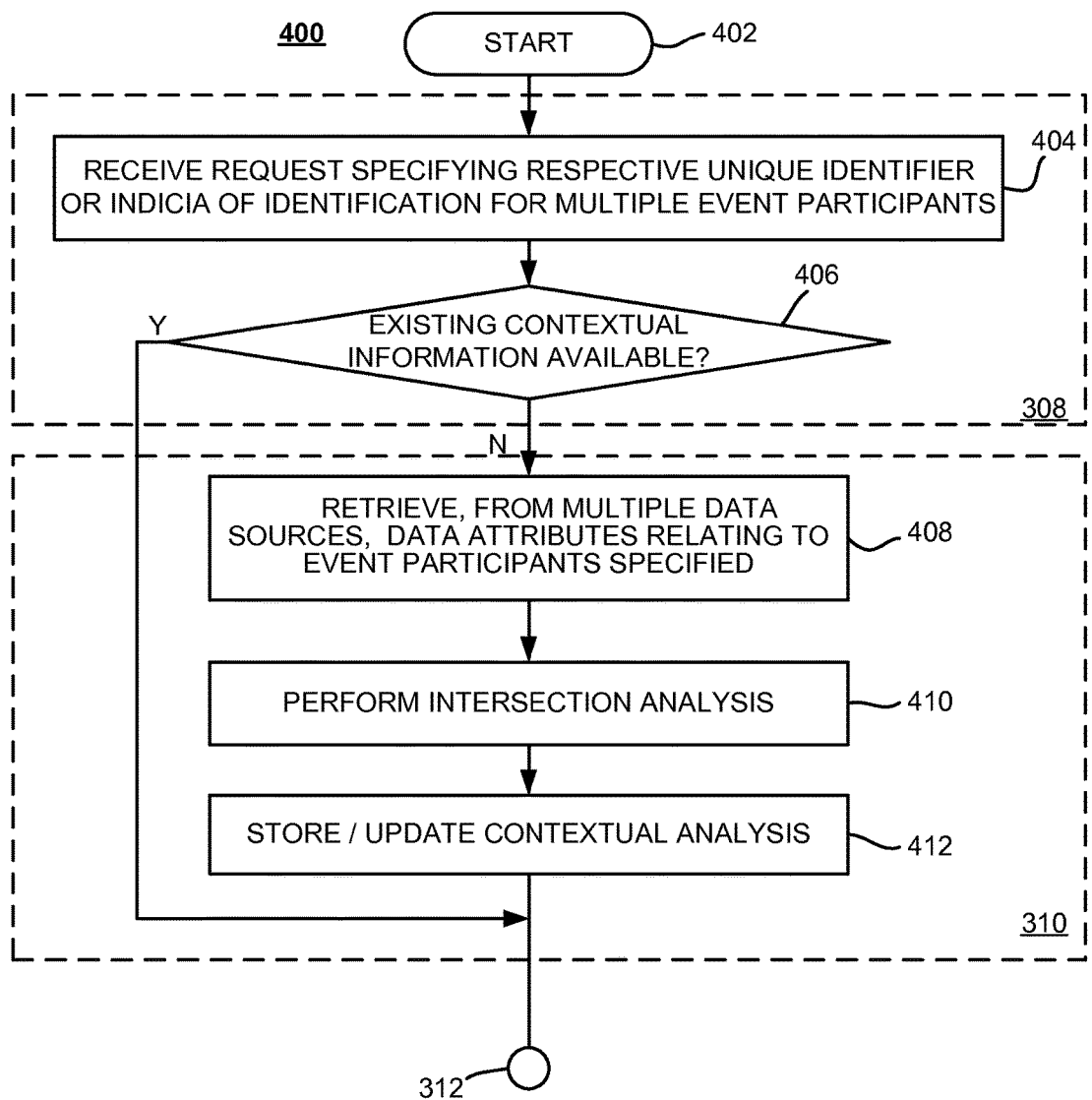
FIG. 4 is a flow diagram depicting further details of a method for dynamically responding to requests and queries for information relating to one or more event invitees or attendees, as performed by the interactive event attendee information response unit of FIG. 1, according to one or more embodiments.

FIG. 4 is a flow diagram depicting further details of a method 400 for dynamically responding to requests for information relating to one or more event invitees or attendees, as performed by the interactive event attendee information response unit of FIG. 1, according to one or more embodiments. The method 400 is entered at step 402 and proceeds to step 404, where the method receives a request specifying unique identifiers or indicia of identification for a plurality of event attendees. Typically, the request is received from an attendee present at or participating in an event, seeking access to contextual information generated according to one or more embodiments. The method proceeds to determination step 406, where it is determined whether existing contextual information is already available those participants identified in the request received at step 400 (the "received request"). If not, the method retrieves, at step 408, data attributes from one or more data sources wherein each of the data attributes retrieved relates to at least one of the event participants. The process then advances to step 410

At step 410, intersection analysis is performed. According to some embodiments, prior to performing intersection analysis, method 400 retrieves attribute processing rules from the user profile of the subject participants. Such rules may preclude certain pre-identified data attributes from being used in the intersection analysis. Alternatively, the rules may that certain contextual data elements (e.g., those elements generated by reference to those attributes tagged as "sensitive" by one or more of the subject participants) be shared only with a specific list of other participants, or that those participants on a "black list" be excluded from having access. Following any optional rules-based pre-processing as described above, the method 400 performs intersection analysis. In some embodiments, the analysis is guided by any user preferences so that no data objects deemed extraneous to the requester be included in the analysis.

According to some embodiments, the method determines at step 406 that at least some contextual information relating two event participants already exists. According to some embodiments, especially those in which event enhancement services are administered by a social networking site, method 400 has access to a pre-populated proprietary data attribute repository, wherein contextual elements expressed as intersections and/or differences of data attributes have been identified a priori. At step 412, the method stores and/or updates the contextual information generated by intersection analyses, in the corresponding invitee profile(s). The method 400 then returns to step 312 of method 300 (FIG. 3).

Figure 5:
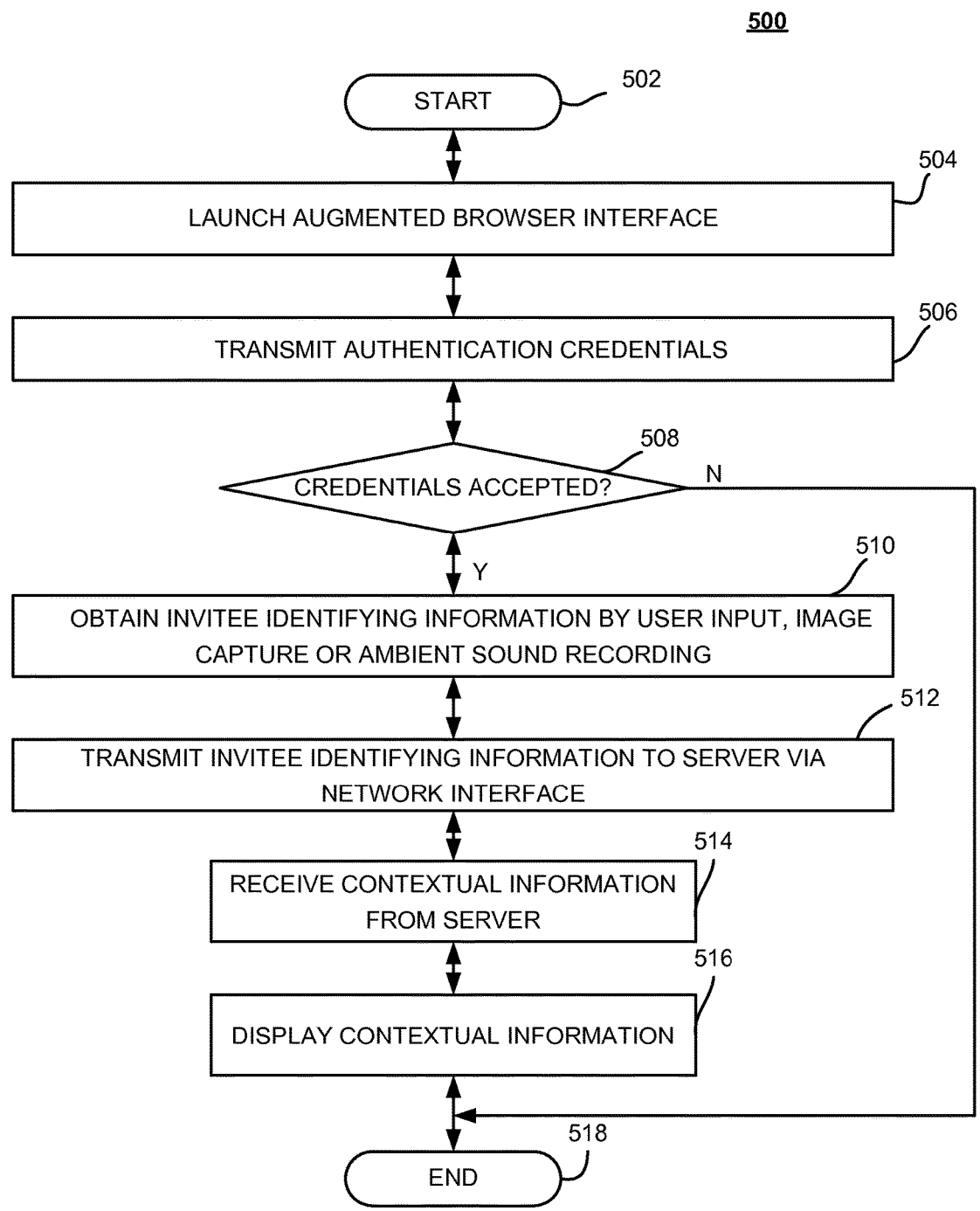
FIG. 5 is a flow diagram depicting the origination of, and processing of a response to, a request for contextual information relating an event attendee to at least one other event attendee, according to one or more embodiments.

FIG. 5 is a flow diagram depicting the origination of, and processing of a response to, a request for contextual information relating an event attendee to at least one other event attendee, according to one or more embodiments. The method 500 is started at step 502 and proceeds to step 504 where a locally installed, event-enhancing application is launched, or a browser is opened invoking functions which are hosted by a server and comparable to those performed by the local application. The method proceeds to step 506, where the method transmits, to an authorization server, authentication credentials of a registered event participant (or other authorized party). Method 500 then proceeds to determination step 508. If the user credentials are accepted at step 508, then the method advances to step 510.

At step 510, the method acquires invitee (or attendee) identifying information from user input, image capture, or ambient sound recording, as collected by peripheral or integral devices associated with a mobile communication terminal such as a Smartphone, tablet or notebook computer, or wearable computer. Each of the foregoing are commonly equipped with an image capture device, touch screen display or eye tracking software, keyboard and mouse, and/or a microphone. The method 500 then advances to step 512, where in some embodiments the acquired identifying information is transmitted to an interactive attendee inquiry response unit associated with a server for processing as a request for contextual information. At step 514, the method receives contextual information from the server and, at step 516, the method displays to the requester the contextual data elements comprising the received contextual information. The method then proceeds to step 520, and ends.

Figure 6:
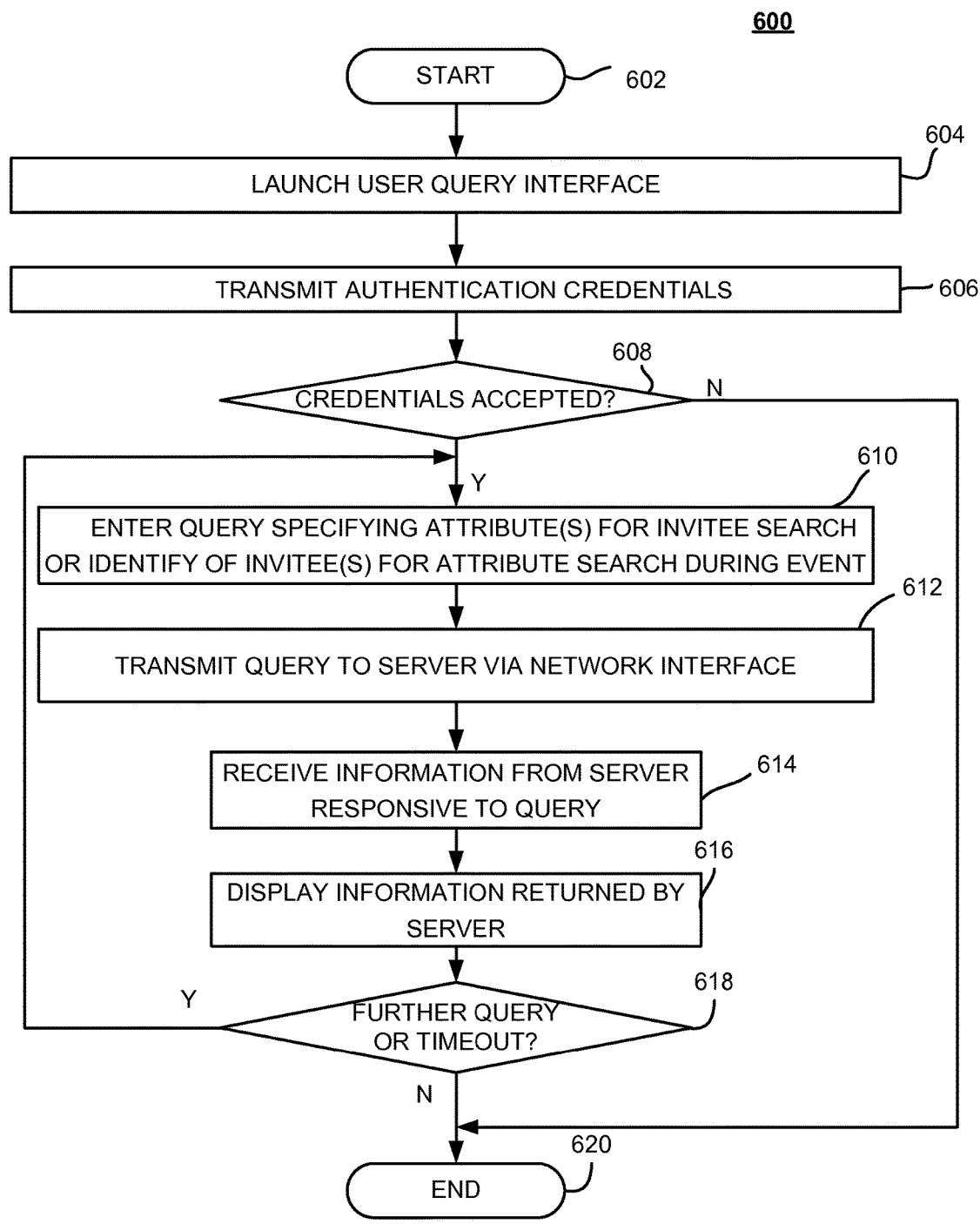
FIG. 6 is a flow diagram depicting the origination of, and processing of a response to, a query specifying attributes for one or more attendees to be identified, or specifying the identity of one or more attendees for whom a list of attributes is requested, according to one or more embodiments.

FIG. 6 is a flow diagram depicting the origination of, and processing of a response to, a query specifying attributes for one or more attendees to be identified, or specifying the identity of one or more attendees for whom a list of attributes is requested, according to one or more embodiments. The method 600 is started at step 602 and proceeds to step 604 where a locally installed, event-enhancing application is launched, or a browser is opened invoking functions which are hosted by a server and comparable to those performed by the local application. The method proceeds to step 606, where the method transmits, to an authorization server, authentication credentials of a registered event participant (or other authorized party). Method 600 then proceeds to determination step 608. If the user credentials are accepted at step 608, then the method advances to step 610.

At step 610, the method acquires invitee (or attendee) identifying information from user input, image capture, or ambient sound recording, as described previously. Such a query is typical of situations in which an event invitee, attendee, or other interest party is seeking an enumeration of data attributes pertaining to a person of known identity. Alternative, or in addition, method 610 receives text input through a touch screen or keyboard identifying one more attributes. Such a query is typical of situations in which the identity of one or more persons possessing the one or more attributes is sought. The method 600 then advances to step 612, where in some embodiments the query acquired at step 610 is transmitted to an interactive attendee inquiry response unit associated with a server for processing as a query for information about one or more event participants. At step 614, the method receives a response to the query from the server and, at step 616, the method displays to the originator of the query any data attributes or identities comprising the received response. If there are further queries, or pending expiration of a time-out window for sending further responses, the method returns to step 610. Otherwise the proceeds to step 620, and ends.

Figure 7A:
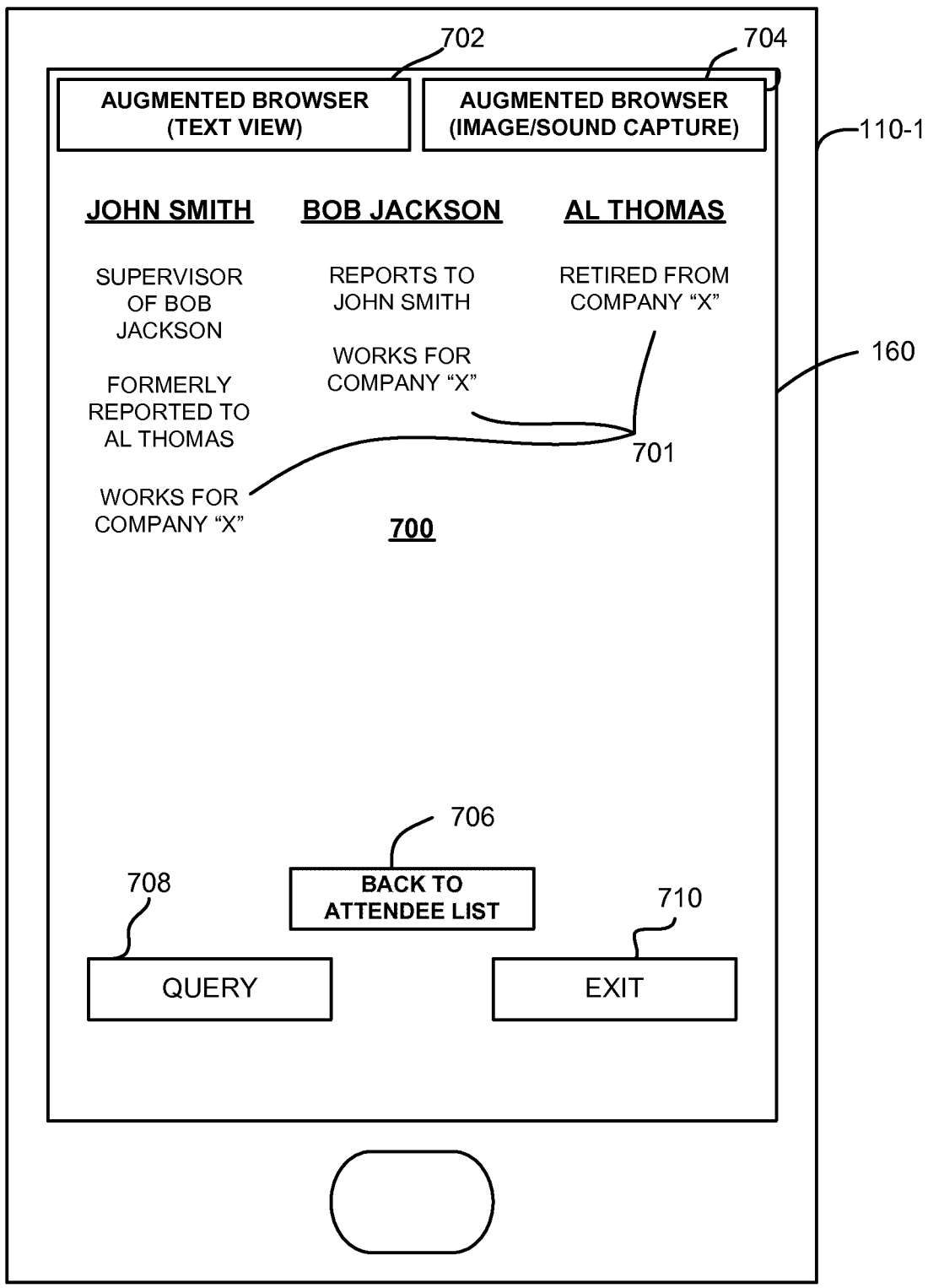
FIGS. 7A and 7B collectively illustrate the enrichment of an attendee's event experience through contextual information, delivered in real time responsive to requests submitted through use of a standardized interface on a mobile communication terminal, according to one or more embodiments.
Figure 7B:
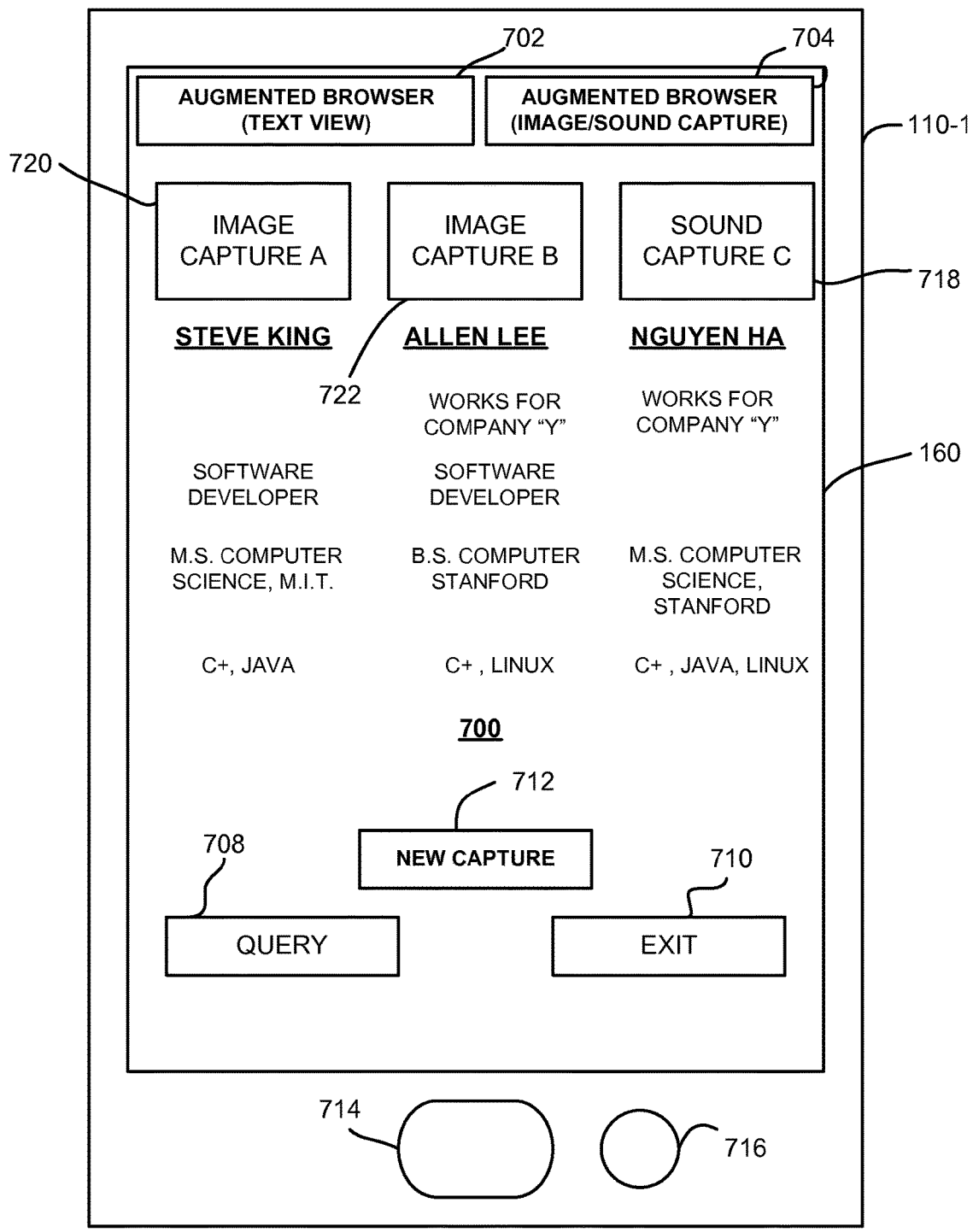

FIGS. 7A and 7B collectively illustrate the enrichment of an attendee's event experience through contextual information delivered, for example, in real time and in response to requests submitted through use of a standardized interface. According to some embodiments, attendees use mobile terminals to submit the requests during an event and to view the responses to those requests. In some embodiments, the requests are transmitted to, and the responses are returned by, a remote server having access to one or more data sources and the analytical resources needed to analyze accessible data attributes.

FIG. 7A illustrates one screen of a multi-screen user interface 700 associated with a browser application. The browser application is displayed on a touch screen display 160 of the mobile communication terminal 110-1 of FIG. 1. In some embodiments, mobile communication terminal 110-1 is registered to or otherwise associated with an event invitee (or other authorized individual) for whom user credentials and other account information are accessible to a remote authorization server. In some embodiments, user interface 700 includes software-defined "Text View" and "Image/Sound Capture" mode selector buttons, 702 and 704 respectively, which enable the user of terminal 110-1 to toggle back and forth between different input entry modes.

The interface depicted in FIG. 7A is invoked by the browser application, in some embodiments, in order to enable the formulation of requests by entry of text and/or touch screen input. By touching only the names "John Smith", "Bob Jackson" and "Al Thomas" on a prior page displaying a directory of all event attendees, for example, the names of these three individuals, as well as the contextual data elements 701 relating them to one another, are displayed. Other displayed software-defined buttons include a "Back to Attendee List" button 706, a "Query" button 708, and an "Exit" Button 710.

FIG. 7B illustrates another screen of the multi-screen interface 700 associated with a browser application, according to some embodiments. The screen depicted in FIG. 7B is invoked at mobile communication terminal 110-1 by touching the displayed feature button 704 from the touch screen display shown in FIG. 7A. In an embodiment, a user of mobile terminal 110-1 has used a camera of device 110-1 to capture an image of Steve King, indicated at numeral 720 and an image of Allen Lee, indicated at numeral 722. As well, the user of mobile terminal 110-1 has further captured a sound recording of the voice of Nguyen Ha, indicated at numeral 718. These have already been submitted as a request to the remote server, and in the illustrative embodiment, the name of each individual identified by the interactive attendee inquiry response unit 120 (FIG. 1A) and is displayed below one of the three corresponding input thumbnails 718-720. As well, individual attributes relating two or more of the subject attendees are displayed. Had the server not found a match, in a data repository, for one of the inputs captured in the manner summarized above, a "New Capture" feature button 712 is available to replace the unmatched input thumbnail with a replacement sample using the same input method (e.g. replacing sound recording capture "C" 718 with a different sound recording) or a new sample using a different input method (e.g., replacing sound recording capture "C" with an image capture showing the subject attendee).

Figure 7C:
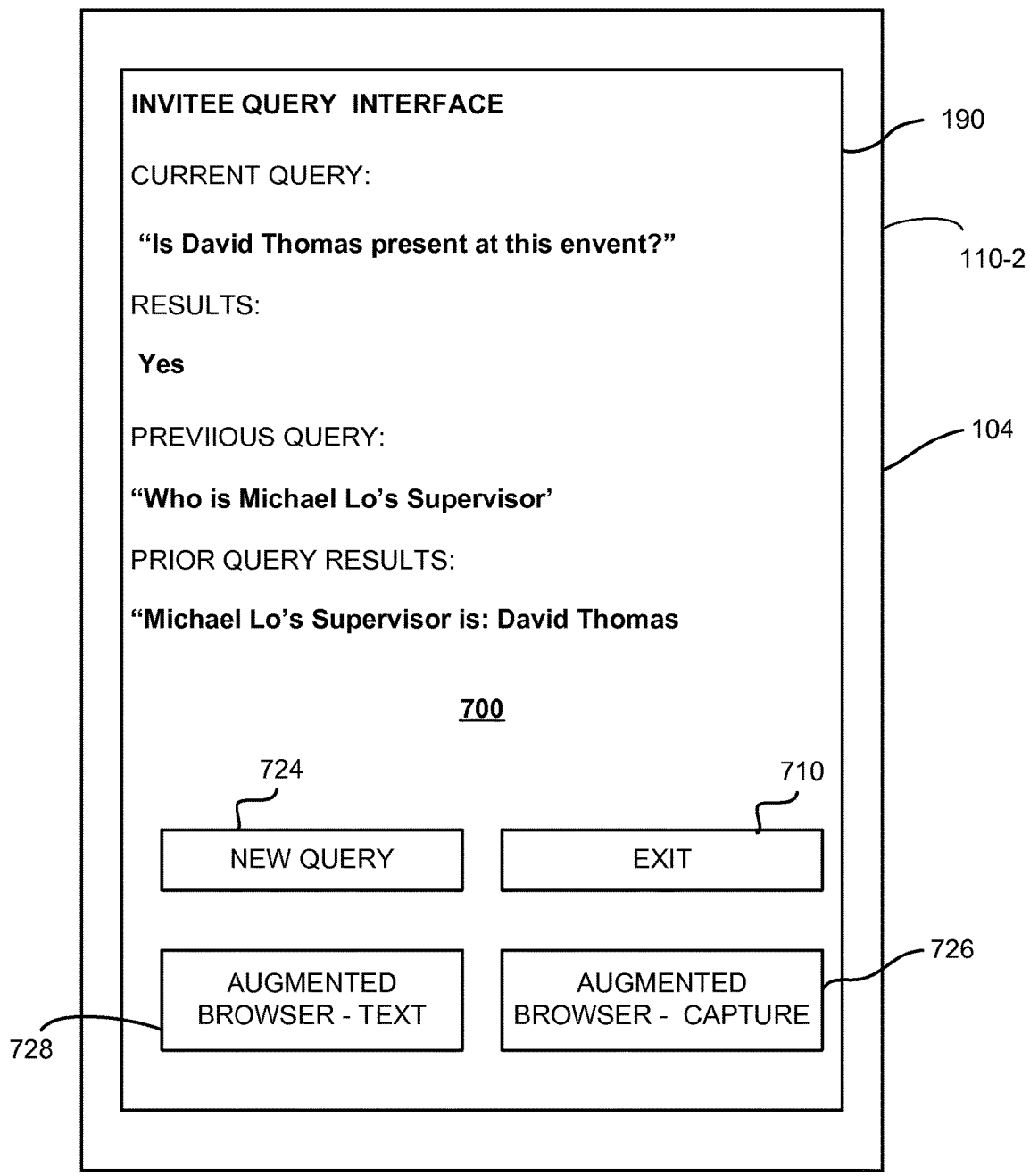
FIG. 7C depicts the enrichment of an invitee's or attendee's event experience through query responses, delivered in advance or in real time responsive to queries submitted through use of a standardized interface on a communication terminal, according to one or more embodiments.

FIG. 7C depicts the enrichment of an invitee's or attendee's event experience through query responses, delivered in advance or in real time responsive to queries submitted through use of a standardized interface on a communication terminal, according to one or more embodiments. In FIG. 7C, a query interface page of interface 700 is presented on the display 190 of communication terminal 110-2. In some embodiments, the query page of FIG. 7C is obtained by navigating away from a previously displayed page, as by clicking on or touching a "Query" feature button (FIG. 7A or 7B) using a mouse. In the illustrative example of FIG. 7C, the user of terminal 110-2 submits queries in text form, and responses are displayed to display 190. Feature button 724 allows the user of terminal 110-2 to enter a new query, while feature button 710 results in closing of the browser window of interface 700. Similarly, actuating either of feature buttons 726 and 728 takes the user to one of the previously described interfaces for entering requests for contextual information.

According to modified embodiments, a location tracking service is used to track the locations of attendees at a live (in-person) event such as a trade show or technical conference having many (e.g., hundreds) attendees. In some cases, an application residing the mobile terminal provides such information to a location tracking server associated with interactive attendee inquiry response unit 120 (FIG. 1A). A subsequent query entered via the interface depicted in FIG. 7C might include "Where is David Thomas"? right after the "Current Query" shown. With location tracking enabled, the display 190 is dynamically updated to display a relative bearing and approximate distance between the requester using device 110-2 and the subject of the query.

It should be noted that although many of the examples herein relate to live-in person sessions, wherein the participants are in the same general area with physical access to one another, such geographic proximity is not a pre-requisite to the enhancement of event attendee experiences according to one or more embodiments. A party to a multi-participant conference call, wherein all the participants are part of the same organization for example, would still benefit from real-time or prior access to contextual data elements and professional data attributes according to embodiments described herein.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for responding to requests from a communication terminal for information relating to at least one event participant, said method executed by an inquiry server in communication with the communication terminal, the inquiry server including one or more processors, a memory in communication with the one or more processors, and a non-transitory computer-readable medium including processor-executable instructions encoded therein, said method comprising:
   receiving, at the inquiry server, a notification of a scheduled event and identities of a plurality of invited event participants;
   in response to receiving the identities, retrieving and storing, by the inquiry server and from multiple data sources, data attributes relating to at least some of the invited event participants, the data attributes being stored in the memory after the retrieving;
   after the retrieving and storing, receiving, at the inquiry server, a request from the communication terminal for contextual information relating a first event participant to at least a second event participant;
   identifying the first event participant from the plurality of event participants by analyzing a digital voice sample, captured from the first event participant by the communication terminal and included with the request, in reference to voice print data for each respective event participant of the plurality of event participants;
   generating, by the processor, the contextual information, the generated contextual information including contextual data elements; and
   transmitting, from the inquiry server to the communication terminal, a response to the request, the response including the generated contextual information.

2. The method according to claim 1, wherein the received request includes at least one image captured during the event.

3. The method according to claim 2, further including a step of analyzing, by the processor, an image, received as part of the request, to identify the second event participant or a third event participant.

4. The method according to claim 3, wherein the request is received during the event and the transmitting is performed during the event.

5. The method according to claim 1, wherein the request is received during the event and the transmitting is performed during the event.

6. The method according to claim 1, wherein the digital voice sample is captured during the event.

7. The method according to claim 1, wherein each of the contextual data elements represents a relative distance between a data attribute of the first event participant and the same data attribute of the second event participant.

8. The method according to claim 1, wherein data attributes of the at least some invited event participants are retrieved from at least one data repository associated with a social network during the retrieving.

9. The method according to claim 8, further including a step of requesting authorization, from an invited event participant, before retrieving respective data attributes from a corresponding data source.

10. The method according to claim 1, wherein the generating includes performing at least one of intersect analysis and difference analysis by reference to the retrieved data attributes.

11. An apparatus for responding to requests from a communication terminal for information relating to at least one event participant, said apparatus comprising:
   an inquiry server having:
      one or more processors;
      a memory in communication with the one or more processors;
      a non-transitory computer-readable medium in communication with the memory and the one or more processors, the non-transitory computer-readable medium including processor-executable instructions encoded therein;
      at least one network interface in communication with the communication terminal; and
      an augmented event request processing module,
      wherein, when executed by the one or more processors, the processor-executable instructions cause the augmented event request processing module to:
         retrieve and store, from multiple data sources, data attributes relating to at least some participants invited to an event, the data attributes being stored in the memory after being retrieved;
         after retrieving and storing the data attributes, receive, from the communication terminal via the at least one network interface, a request for contextual information relating a first event participant to at least a second event participant;
         identify the first event participant from at least some of the participants by analyzing a digital voice sample, captured from the first event participant by the communication terminal and included with the request, in reference to voice print data for each respective participant of at least some of the participants;
         generate the contextual information including one or more contextual data elements responsive to received request; and
         transmit, to the communication terminal via the at least one network interface, the generated contextual information in response to the received request.

12. The apparatus of claim 11, wherein, when executed by the one or more processors, the processor-executable instructions further cause the augmented event request processing module to:
   receive an image captured during the event; and
   analyze the received image to identify the second event participant or a third event participant.

13. The apparatus of claim 11, wherein each of the contextual data elements represents a relative distance between a data attribute of the first event participant and the same data attribute of the second event participant.

14. A computer implemented method for responding to requests from a communication terminal for information relating to at least one event participant, said method executed by an inquiry server in communication with the communication terminal, the inquiry server including one or more processors, a memory in communication with the one or more processors, and a non-transitory computer-readable medium in communication with the memory and the one or more processors, said method comprising:

retrieving and storing, by the inquiry server and from at least one data source, data attributes relating to at least some participants in an event, the data attributes being stored in the memory after the retrieving;

in response to the retrieving, receiving, at the inquiry server, an inquiry from the communication terminal during the event for contextual information relating a first event participant to at least a second event participant;

identify the first event participant from at least some of the participants by analyzing a digital voice sample, captured from the first event participant by the communication terminal and included with the request, in reference to voice print data for each respective participant of at least some of the participants;

generating, by the processor, the contextual information, the generated contextual information including one or more contextual data elements; and transmitting, from the inquiry server to the communication terminal, a response to the inquiry, the response including the generated contextual information, wherein the inquiry is received from the communication terminal operated by a first participant, the inquiry including at least one of text input, an image of a second participant, or a voice recording of a second participant.

15. The method according to claim 14, wherein the at least one data source includes a social networking site.

16. The method according to claim 14, wherein the at least one data source includes an enterprise server containing data attributes corresponding to its employees.

17. The method according to claim 14, wherein the event is a conference call wherein at least some of the participants are remotely located relative to one another.

18. The method according to claim 14, wherein each of the contextual data elements represents a relative distance between a data attribute of the first event participant and the same data attribute of the second event participant.

19. The method according to claim 14, wherein the event is a web conference or an audio only conference.

* * * * *